April 3, 1962  F. M. NICHOLSON  3,027,963
VEHICLE STEERING MEANS
Filed July 13, 1960  2 Sheets-Sheet 1

WITNESS
NORMAN G. TRAVISS

INVENTOR
FRANK M. NICHOLSON
BY Talbert Dick and Darley
ATTORNEYS

April 3, 1962 F. M. NICHOLSON 3,027,963
VEHICLE STEERING MEANS

Filed July 13, 1960 2 Sheets-Sheet 2

INVENTOR
FRANK M. NICHOLSON
WITNESS BY Talbert Dick & Farley
NORMAN G. TRAVISS ATTORNEYS ID
3,027,963
VEHICLE STEERING MEANS
Frank M. Nicholson, Deloit, Iowa
Filed July 13, 1960, Ser. No. 42,607
8 Claims. (Cl. 180—79.2)

This invention relates to a vehicle steering means and more particularly to an improved steering mechanism that permits the vehicle to successfully turn in a minimum radius.

Obviously some vehicles herebefore have been capable of making relatively small radius turns but two very serious problems were encountered. Firstly, the vehicle became highly unbalanced with a tendency to turn over thereby endangering both property and lives. Secondly, the operator of the vehicle was required to exert great effort in effecting the steering of the vehicle. While my steering means may be successfully used on various types of vehicles it is especially designed for use on tractors wherein it is often desired to accomplish sharp turns. Farm tractors and like are, however, notoriously hard to steer. Some effort has been made in the last few years to assist the steering phase by the application of power, such as hydraulic power. I have found, however, by experimentation that when power steering is used on a tractor having sharp turn characteristics, there is so much loose play in the mechanism that the tractor is difficult to steer in a straight course and especially over rough terrain.

Therefore, the principal object of my invention is to provide a steering means for vehicles that permits the vehicle to be turned in a small radius.

A further object of my invention is to provide a small radius turning means for tractors or like that has a minimum of lost play and permits the vehicle to be easily steered in a straight path.

A still further object of this invention is to provide a steering means for vehicles that maintains proper vehicle stability during the turning moment in either direction.

Still further objects of this invention are to provide a vehicle steering means that is economical in manufacture and durable in use.

These and other objects will be apparent to those skilled in the art.

Figure 1:
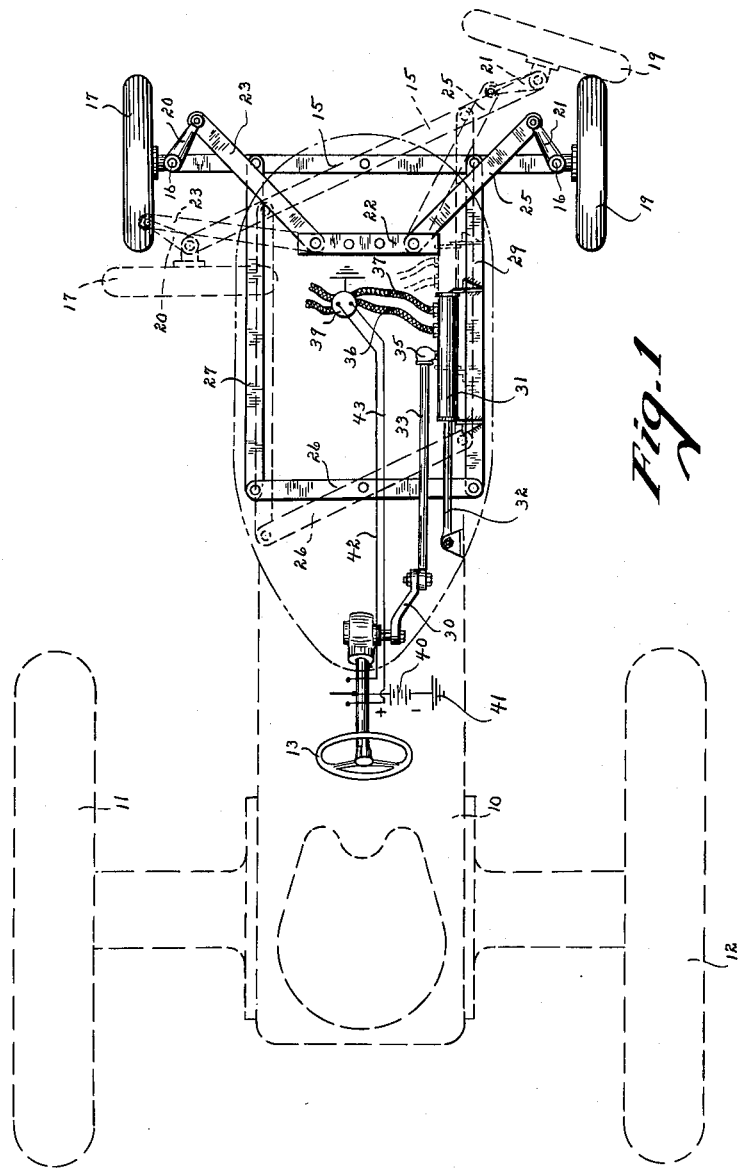
Figure 2:
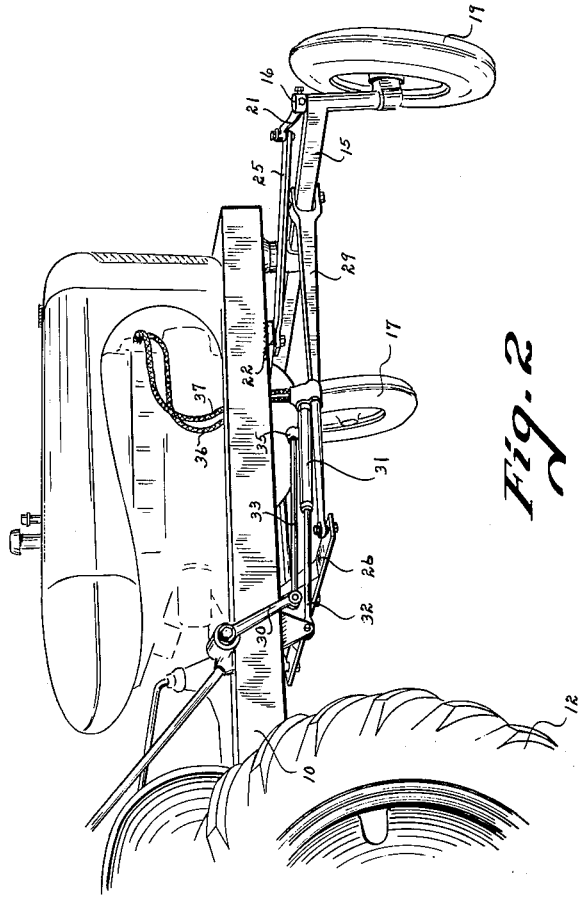

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a top plan view of my vehicle steering means installed on a farm tractor, and FIG. 2 is a side perspective view of my device installed on a tractor.

In these drawings I have used the numeral 10 to generally designate a farm tractor having two rear wheels 11 and 12 and the rotatable steering wheel 13. The numeral 15 designates the horizontal front axle beam horizontally pivoted about a vertical axis at its center to the under side of the front end of the tractor 10. Rotatably mounted in each of the outer end portions of the axle beam 15 is a vertical axle 16. Each of these axles 16 have their lower end portions bent horizontally to support a wheel. These two wheels are designated by the numerals 17 and 19 and form the two front rotatable wheels of the tractor 10. Secured to the top of the left axle 16 is a guide arm 20. A similar guide arm 21 is secured to the top of the right axle 16. When the vehicle is moving in a straight longitudinal path these two guide arms 20 and 21 will extend forwardly and inwardly as shown in FIG. 1. Rigidly secured on the under side of the tractor frame and to the rear of the axle beam 15 is a bar 22 extending transversely of the longitudinal axis of the tractor. The numeral 23 designates a link bar having its forward end pivoted to the outer end of the guide bar 20 and its other end pivoted to the bar 22. The numeral 25 designates a link bar having one end pivoted to the free end of the guide arm 21 and its other end pivoted to the bar 23. These two link bars 23 and 25 normally extend forwardly and outwardly when the vehicle is moving in a longitudinal path as shown in FIG. 1. The rear ends of the link bars 23 and 25 that are hingedly pivoted to the bar 22 are normally spaced apart but obviously by the adjustment of the bar 22 or by the adjustment of the link bars 23 and 25 on the bar 22, the wheels 17 and 19 may be adjusted for alignment for toe-in effects or like. By this structure, thus far described, if the axle beam 15 is swung to the left, not only will the front wheels 17 and 19 swing therewith, but due to the linkage connections the wheels 17 and 19 will be turned toward the left relative to the axle beam 15 as shown by broken lines in FIG. 1. Likewise, if the axle beam 15 is swung to the right relative to the longitudinal axis of the tractor, the front wheels will not only swing with the axle beam, but due to the described linkage will turn to the right relative to the axle beam 15.

The numeral 26 designates a horizontal bar pivoted at its center to the under side of the tractor 10. The bar 26 is at the rear of the fixed bar 22 as shown in FIG. 2. The numeral 27 designates a link bar having one end pivotally secured to the left end of the bar 26 and its other end pivotally secured to the left end portion of the axle beam 15. The numeral 29 designates a link bar having its rear end pivotally secured to the right end of the bar 26 and its forward end pivotally secured to the right end portion of the axle beam 15. When the vehicle is moving in a direction longitudinal to its length, the axle beam 15, bar 26 and link bars 27 and 29 form a rectangular pattern as shown in FIG. 1. By this arrangement of parts if the link bar 27 is moved forwardly, the link bar 29 will move rearwardly and if the link bar 27 is moved rearwardly, the link bar 29 will move forwardly. Also if the link bar 29 is moved forwardly, the link bar 27 will move rearwardly and if the link bar 29 is moved rearwardly, the link bar 27 will move forwardly. Thus, by the arrangement of the parts described, a short forward movement of the bar 29 will not only swing the axle beam to the left but the front wheels will also be turned to the left and the tractor will be able to turn to the left in substantially its own length as shown by the broken lines of FIG. 1. If the link bar 29 is moved to the rear, the axle beam 15 and wheels 17 and 19 will turn to the right. In substantially all tractors the steering wheel shaft is connected to a crank arm 30. Rigidly secured to the link bar 29 is an ordinary hydraulic cylinder 31 having a piston shaft 32 pivotally secured to the tractor frame as shown in FIG. 2. The numeral 33 designates a rod having its rear end pivotally connected to the crank arm 30 and its forward end secured by a universal joint 35 to the cylinder 31. These described parts operatively manually connect the steering wheel 13 with the link bar 29 and if the steering wheel 13 is manually rotated to the right, the link bar 29 will be moved rearwardly. If the steering wheel 13 is rotated to the left, the link bar 29 will be moved forwardly for turning the tractor to the left.

As herebefore noted, most tractors are difficult to steer and, therefore, I recommend a hydraulic power assist. The hyldraulic cylinder and piston may be of any suitable type, i.e., a two-way type or have at one end a pressure supply conduit and a suction conduit. In the drawings I show the latter type. Substantially all tractors have a source of hydraulic power created by a pump means. The conduit 36 may be the pressure conduit having one end communicating with the inside of the forward end of the cylinder 31 and its other end connected to the source of fluid pressure (not shown). The numeral 37 designates the suction conduit communicating with the inside forward end of the cylinder 31 and its other end connected to the suction side of the pump or like (not shown). Imposed in these two conduits 36 and 37 is an ordinary electrically actuated valve 39 capable of opening the conduit 36 and closing the conduit 37 or opening the conduit 37 and closing the conduit 36. When such valves are in a neutral position the hydraulic cylinder means is not effective. Any suitable switching means may be used to actuate the valve 39. In the drawings I show, in symbol, a switch means imposed on the steering shaft of the steering wheel 13. The switch is connected to the tractor battery 40 and also to the tractor ground 41. When the steering wheel and its shaft are turned to the right, electrical contact will be made with the electric lead line 42 which leads to the valve 39 and suction will occur through the conduit 37 and the steering mechanism will turn to the right. On the other hand if the steering wheel 13 and its shaft are turned to the left, the lead wire 43 will be electrically connected to the valve 39 and the pressure conduit will feed fluid under pressure into the cylinder 31 thereby moving the link bar 29 forwardly and turning the vehicle to the left.

From the foregoing it will be seen that I have provided a vehicle steering means that provides excellent stability to the vehicle, will cause the vehicle to turn in a small radius and may be operated either by manual means or power means.

Some changes may be made in the construction and arrangement of my vehicle steering means without departing from the real spirit and purpose of my invention, and it is my intention to cover by my claims, any modified forms of structure or use of mechanical equivalents which may be reasonably included within their scope.

I claim:

1. In combination, a vehicle having at least two supporting wheels, an axle beam horizontally pivoted about a vertical axis at its center to said vehicle, an L-shaped axle rotatably mounted on each end of said axle beam; said lower portion of each of said L-shaped axles extending horizontally, a wheel rotatably mounted on the horizontal portion of each of said L-shaped axles, an arm secured to each of said L-shaped axles, a link bar having one end operatively pivoted to said vehicle and its other end pivoted to one of said arms, a second link bar having one end operatively pivoted to said vehicle and its other end pivoted to said other arm, a bar pivoted at its center to said vehicle, a third link bar having one end pivoted to one end of said bar and its other end pivoted to the left end portion of said axle beam, a fourth link bar having one end pivoted to the other end of said bar and its other end pivoted to the right end portion of said axle beam, and means for reciprocating one of said last two mentioned link bars.

2. In combination, a vehicle having at least two supporting wheels, a horizontal front axle beam horizontally pivoted about a vertical axis at its center to said vehicle, an L-shaped axle rotatably mounted on each end of said axle beam; said lower portion of each of said L-shaped axles extending horizontally, a wheel rotatably mounted on the horizontal portion of each of said L-shaped axles, an arm secured to each of said L-shaped axles, a link bar having one end operatively pivoted to said vehicle and its other end pivoted to one of said arms, a second link bar having one end operatively pivoted to said vehicle and its other end pivoted to said other arm, a bar pivoted at its center to said vehicle, a third link bar having one end pivoted to one end of said bar and its other end pivoted to the left end portion of said axle beam, a fourth link bar having one end pivoted to the other end of said bar and its other end pivoted to the right end portion of said axle beam, and means for reciprocating one of said last two mentioned link bars; said two arms normally extending forwardly and inwardly.

3. In combination, a vehicle having at least two supporting wheels, a horizontal front axle beam horizontally pivoted about a vertical axis at its center to said vehicle, an L-shaped axle rotatably mounted on each end of said axle beam; said lower portion of each of said L-shaped axles extending horizontally, a wheel rotatably mounted on the horizontal portion of each of said L-shaped axles, an arm secured to each of said L-shaped axles and extending forwardly of said front axle beam, a link bar having one end operatively pivoted to said vehicle and its other end pivoted to one of said arms, a second link bar having one end operatively pivoted to said vehicle and its other end pivoted to said other arm, a bar pivoted at its center to said vehicle, a third link bar having one end pivoted to one end of said bar and its other end pivoted to the left end portion of said axle beam, a fourth link bar having one end pivoted to the other end of said bar and its other end pivoted to the right end portion of said axle beam, and means for reciprocating one of said last two mentioned link bars.

4. In combination, a vehicle having at least two supporting wheels, an axle beam horizontally pivoted about a vertical axis at its center to said vehicle, an L-shaped axle rotatably mounted on each end of said axle beam; said lower portion of each of said L-shaped axles extending horizontally, a wheel rotatably mounted on the horizontal portion of each of said L-shaped axles, an arm secured to each of said L-shaped axles, a link bar having one end operatively pivoted to said vehicle and its other end pivoted to one of said arms, a second link bar having one end operatively pivoted to said vehicle and its other end pivoted to said other arm, a bar pivoted at its center to said vehicle and to the rear of said first and second mentioned link bars, a third link bar having one end pivoted to one end of said bar and its other end pivoted to the left end portion of said axle beam, a fourth link bar having one end pivoted to the other end of said bar and its other end pivoted to the right end portion of said axle beam, and means for reciprocating one of said last two mentioned link bars.

5. In combination, a vehicle having at least two supporting wheels and a steering wheel means, an axle beam horizontally pivoted about a vertical axis at its center to said vehicle, an L-shaped axle rotatably mounted on each end of said axle beam; said lower portion of each of said L-shaped axles extending horizontally, a wheel rotatably mounted on the horizontal portion of each of said L-shaped axles, an arm secured to each of said L-shaped axles, a link bar having one end operatively pivoted to said vehicle and its other end pivoted to one of said arms, a second link bar having one end operatively pivoted to said vehicle and its other arm pivoted to said other end, a bar pivoted at its center to said vehicle, a third link bar having one end pivoted to one end of said bar and its other end pivoted to the left end portion of said axle beam, a fourth link bar having one end pivoted to the other end of said bar and its other end pivoted to the right end portion of said axle beam, and a linkage means operatively connecting said steering wheel means with one of said two last mentioned link bars.

6. In combination, a vehicle having at least two supporting wheels and a steering wheel means, an axle beam horizontally pivoted about a vertical axis at its center to said vehicle, an L-shaped axle rotatably mounted on each end of said axle beam; said lower portion of each of said L-shaped axles extending horizontally, a wheel rotatably mounted on the horizontal portion of each of said L-shaped axles, an arm secured to each of said L-shaped axles, a link bar having one end operatively pivoted to said vehicle and its other end pivoted to one of said arms, a second link bar having one end operatively pivoted to said vehicle and its other end pivoted to said other arm, a bar pivoted at its center to said vehicle, a third link bar having one end pivoted to one end of said bar and its other end pivoted to the left end portion of said axle beam, a fourth link bar having one end pivoted to the other end of said bar and its other end pivoted to the right end portion of said axle beam, a hydraulic power cylinder having its cylindrical portion secured to one of said last two mentioned link bars and its piston portion secured to said vehicle, two conduits communicating with the inside of the cylindrical portion of said hydraulic power cylinder adapted to be in communication with a source of power, a valve means imposed in said conduits, and means for operatively connecting said valve means to the steering wheel means of said vehicle.

7. In combination, a vehicle having at least two supporting wheels and a steering wheel means, an axle beam horizontally pivoted about a vertical axis at its center to said vehicle, an L-shaped axle rotatably mounted on each end of said axle beam; said lower portion of each of said L-shaped axles extending horizontally, a wheel rotatably mounted on the horizontal portion of each of said L-shaped axles, an arm secured to each of said L-shaped axles, a link bar having one end operatively pivoted to said vehicle and its other end pivoted to one of said arms, a second link bar having one end operatively pivoted to said vehicle and its other end pivoted to said other arm, a bar pivoted at its center to said vehicle, a third link bar having one end pivoted to one end of said bar and its other end pivoted to the left end portion of said axle beam, a fourth link bar having one end pivoted to the other end of said bar and its other end pivoted to the right end portion of said axle beam, a hydraulic power cylinder having its cylindrical portion secured to one of said last two mentioned link bars and its piston portions secured to said vehicle, two conduits communicating with the inside of the cylindrical portion of said hydraulic power cylinder adapted to be in communication with a source of power, a valve means imposed in said conduits, means for operatively connecting said valve means to the steering wheel means of said vehicle, and mechanical means operatively connecting said steering wheel means with the cylindrical portion of said hydraulic power cylinder.

8. In combination, a vehicle having at least two supporting wheels, a horizontal front axle beam horizontally pivoted about a vertical axis at its center to said vehicle, an L-shaped axle rotatably mounted on each end of said axle beam; said lower portion of each of said L-shaped axles extending horizontally, a wheel rotatably mounted on the horizontal portion of each of said L-shaped axles, an arm secured to each of said L-shaped axles, a link bar having one end operatively pivoted to said vehicle and its other end pivoted to one of said arms, a second link bar having one end operatively pivoted to said vehicle and its other end pivoted to said other arm, a bar pivoted at its center to said vehicle, a third link bar having one end pivoted to one end of said bar and its other end pivoted to the left end portion of said axle beam, a fourth link bar having one end pivoted to the other end of said bar and its other end pivoted to the right end portion of said axle beam, and means for reciprocating one of said last two mentioned link bars; said two arms normally extending forward and inwardly; said first and second link bars extending forwardly and outwardly.

References Cited in the file of this patent
UNITED STATES PATENTS

| | | |
|---|---|---|
| 911,142 | Martin | Feb. 2, 1909 |
| 2,488,989 | Smallwood | Nov. 22, 1949 |
| 2,870,645 | Tarlton | Jan. 27, 1959 |